US010465664B2

(12) United States Patent
Garry et al.

(10) Patent No.: US 10,465,664 B2
(45) Date of Patent: Nov. 5, 2019

(54) METHOD FOR REPLACING A GENERATOR FRAME OF A WIND TURBINE (71) Applicant: General Electric Company, Schenectady, NY (US)

(72) Inventors: Michael Garry, Asheville, NC (US); Hunter Ryan Anderson, Muskegon, MI (US); Arianna Abram, Albany, NY (US); Richard Jenkins, Rhinelander, WI (US); Nicholas Joseph Cleveland, Cohoes, NY (US); Gregory Thomas, Saratoga Springs, NY (US); Michael Royce Johnson, Campton, NH (US); Michael Frederick Sander, Colonie, NY (US); Jonathan Paul Signore, Latham, NY (US)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 15/654,762

(22) Filed: Jul. 20, 2017

(65) Prior Publication Data
US 2019/0024637 A1    Jan. 24, 2019

(51) Int. Cl.
*F03D 80/50*   (2016.01)
*F03D 9/25*    (2016.01)
(Continued)

(52) U.S. Cl.
CPC .............. *F03D 80/50* (2016.05); *F03D 9/25* (2016.05); *F03D 13/10* (2016.05); *F03D 13/20* (2016.05);
(Continued)

(58) Field of Classification Search
CPC .......... F03D 80/50; F03D 80/82; F03D 80/85; F05B 2230/60; F05B 2230/70; F05B 2230/80
See application file for complete search history.

(56) References Cited

U.S. PATENT DOCUMENTS

| 8,510,943 B2 | 8/2013 | Daniels et al. |
| 2003/0071469 A1 | 4/2003 | Becker |
| 2010/0139069 A1 | 6/2010 | Daniels et al. |

FOREIGN PATENT DOCUMENTS

| DE | 10 2011 007 836 B3 | 10/2012 |
| WO | 2007/096008 A1 | 8/2007 |

OTHER PUBLICATIONS

Extended European Search Report and Opinion issued in connection with corresponding EP Application No. 18184442.4 dated Nov. 26, 2018.

*Primary Examiner* — Moshe Wilensky
*Assistant Examiner* — Kyle A Cook
(74) *Attorney, Agent, or Firm* — Dority & Manning, P.A.

(57) ABSTRACT

A method for replacing an existing generator frame that supports a generator of a wind turbine includes removing the generator from atop the existing generator frame. The method also includes dismounting a control cabinet of the wind turbine from the existing generator frame. More specifically, the control cabinet is electrically connected to one or more wind turbine components via a plurality of cables. The method further includes relocating and securing the control cabinet to an uptower location within a nacelle of the wind turbine with the plurality of cables remaining electrically connected. As such, the method includes removing the existing generator frame from within the nacelle. Moreover, the method includes installing a new generator frame in
(Continued)

place of the removed existing generator frame. Thus, the method also includes remounting the control cabinet to the new generator frame.

17 Claims, 6 Drawing Sheets

(51) Int. Cl.
*F03D 13/10* (2016.01)
*F03D 80/80* (2016.01)
*F03D 13/20* (2016.01)

(52) U.S. Cl.
CPC .......... *F03D 80/88* (2016.05); *F05B 2230/60* (2013.01); *F05B 2230/70* (2013.01); *F05B 2230/80* (2013.01); *F05B 2240/90* (2013.01)

METHOD FOR REPLACING A GENERATOR FRAME OF A WIND TURBINE

FIELD

The present disclosure relates generally to wind turbines, and more particularly to methods for replacing a generator frame for a generator of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid. Modern wind turbines may also include a turbine controller housed in a control cabinet for controlling the various components thereof.

Typically, the generator is supported by a generator frame that is mounted to a bedplate within the nacelle. The control cabinet is also often mounted to the generator frame. Over time, the generator frame can become damaged, e.g. at critical weld locations due to dynamic loads acting on the frame. If the generator frame needs to be replaced, however, the control cabinet must also be removed and reinstalled, which is labor intensive and time-consuming. More specifically, the wires associated with the control cabinet (which can include hundreds and even thousands of wires) must first be disconnected to remove and detach the cabinet from the generator frame and then reconnected again once the new generator frame is reinstalled.

Accordingly, improved methods and systems for replacing a generator frame for the generator that addresses the aforementioned issues would be welcomed in the technology. As such, the present disclosure is directed to methods for replacing a generator frame for a generator of a wind turbine that do not require the cables of the control cabinet to be disconnected.

BRIEF DESCRIPTION

Aspects and advantages of the invention will be set forth in part in the following description, or may be obvious from the description, or may be learned through practice of the invention.

In one aspect, the present disclosure is directed to a method for replacing an existing generator frame that supports a generator of a wind turbine. The method includes removing the generator from atop the existing generator frame. The method also includes dismounting a control cabinet of the wind turbine from the existing generator frame. More specifically, the control cabinet is electrically connected to one or more wind turbine components via a plurality of cables. The method further includes relocating and securing the control cabinet to an uptower location within a nacelle of the wind turbine with the plurality of cables remaining electrically connected. As such, the method includes removing the existing generator frame from within the nacelle. Moreover, the method includes installing a new generator frame in place of the removed existing generator frame. Thus, the method also includes remounting the control cabinet to the new generator frame.

In one embodiment, the method may also include removing one or more support structures from the existing generator frame so as to free up the plurality of cables of the control cabinet that pass through the existing generator frame. In another embodiment, the method may include removing one or more support structures from the new generator frame before installation. In such embodiments, the support structure(s) of the existing generator frame and the new generator frame may include beams, brackets, or similar of the generator frame.

In further embodiments, the step of relocating and securing the control cabinet to the uptower location within the nacelle of the wind turbine may include securing a support frame to the control cabinet and securing the support frame to the uptower location.

In additional embodiments, the uptower location may include a catwalk or another support surface within the nacelle of the wind turbine. Further, in certain embodiments, the support frame may extend beyond the uptower location so as to provide additional mounting space for the control cabinet. In particular embodiments, the support frame may have an I-beam configuration. In yet another embodiment, the method may include securing the support frame to the uptower location via at least one of one or more brackets, one or more fasteners, one or more straps, and/or combinations thereof.

In several embodiments, the step of remounting the control cabinet to the new generator frame may include dismounting the control cabinet from the uptower location, removing the support frame from the control cabinet, relocating the control cabinet atop the new generator frame, and securing the control cabinet to the new generator frame. In further embodiments, the step of remounting the control cabinet to the new generator frame may also include organizing the cables of the control cabinet into a cable tray, and securing the cable tray to the new generator frame.

In another aspect, the present disclosure is directed to a method for removing an existing generator frame that supports a generator of a wind turbine. The method includes removing the generator from atop the existing generator frame. The method also includes removing one or more support structures from the existing generator frame so as to free up cables of a control cabinet of the wind turbine that pass through the existing generator frame. Further, the method includes dismounting the control cabinet from the existing generator frame. More particularly, the control cabinet is electrically connected to one or more wind turbine components via a plurality of cables. As such, the method further includes securing the control cabinet to a different uptower location within a nacelle of the wind turbine with the cables remaining electrically connected. Moreover, the method includes removing the existing generator frame from within the nacelle. It should be understood that the method may further include any of the additional steps and/or features as described herein.

In yet another aspect, the present disclosure is directed to a method for installing a new generator frame that supports a generator into a nacelle of a wind turbine. The method includes relocating a control cabinet of the wind turbine from a first location to a second location within a nacelle of the wind turbine with cables of the control cabinet remaining electrically connected. The method also includes installing a new generator frame in the first location. Further, the method includes remounting the control cabinet to the new generator frame.

In one embodiment, the method may further include removing one or more support structures from a new generator frame before installation. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
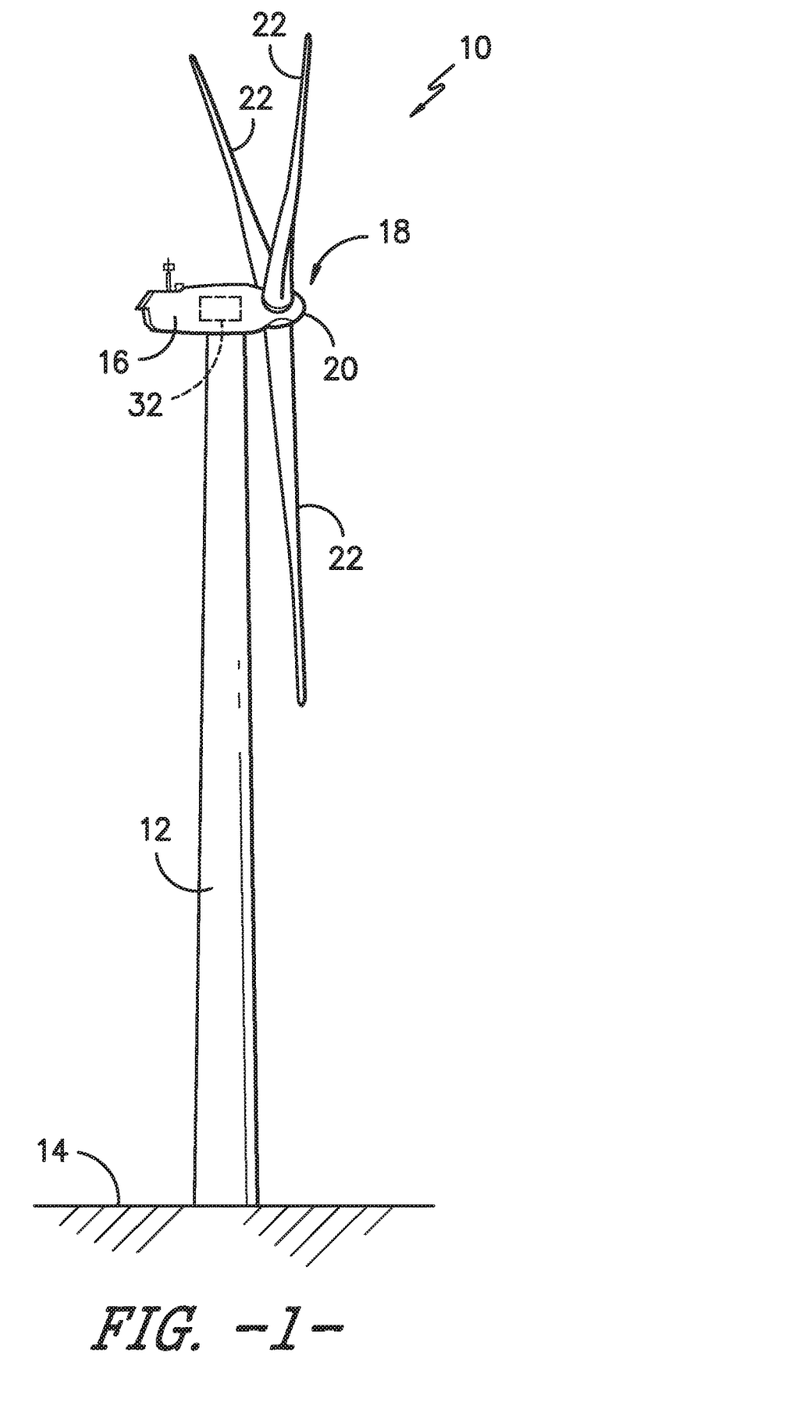
FIG. 1 illustrates a perspective view of a wind turbine according to one embodiment of the present disclosure.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator 25 (FIG. 2) positioned within the nacelle 16 to permit electrical energy to be produced.

Figure 2:
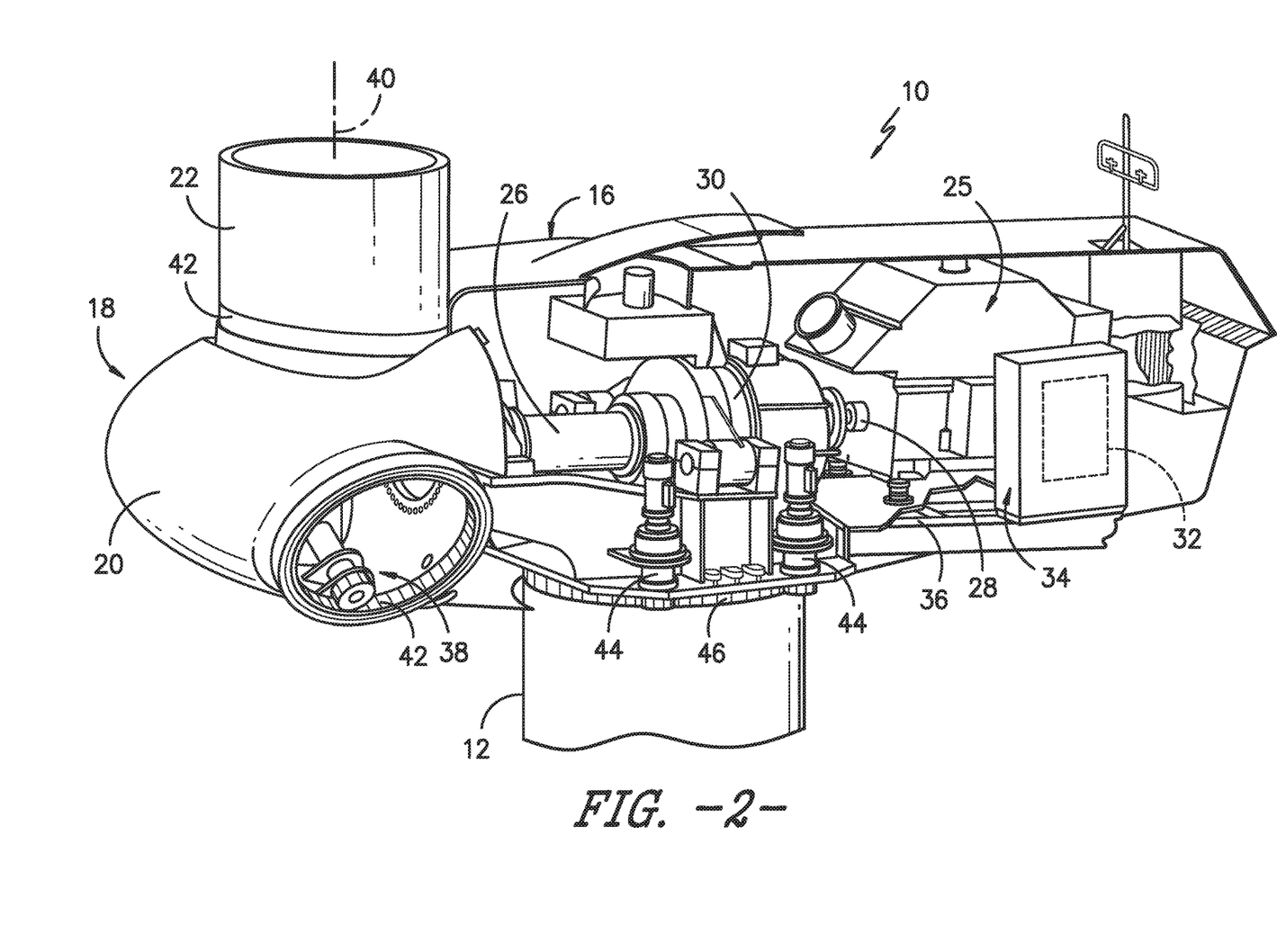
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 25 may be disposed within the nacelle 16 and supported atop a generator frame 36. In general, the generator 25 may be coupled to the rotor 18 for producing electrical power from the rotational energy generated by the rotor 18. For example, as shown in the illustrated embodiment, the rotor 18 may include a rotor shaft 26 coupled to the hub 20 for rotation therewith. The rotor shaft 26 may, in turn, be rotatably coupled to a generator shaft 28 of the generator 25 through a gearbox 30. As is generally understood, the rotor shaft 26 may provide a low speed, high torque input to the gearbox 30 in response to rotation of the rotor blades 22 and the hub 20. The gearbox 30 may then be configured to convert the low speed, high torque input to a high speed, low torque output to drive the generator shaft 28 and, thus, the generator 25.

Figure 3:
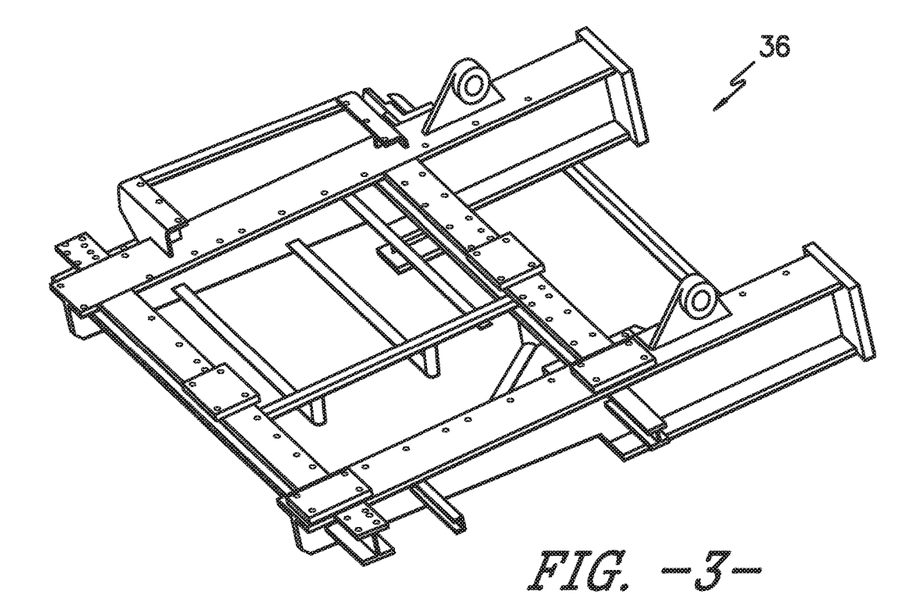
FIG. 3 illustrates a perspective view of one embodiment of a generator frame for supporting a generator of a wind turbine according to the present disclosure.
Figure 4:
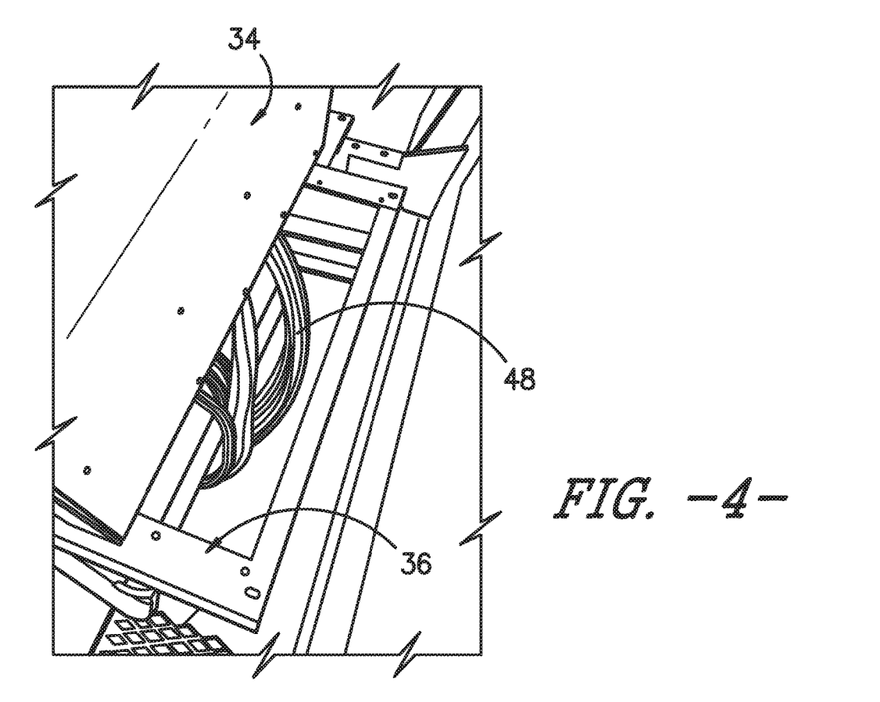
FIG. 4 illustrates a perspective view of one embodiment of a control cabinet having a plurality of cables mounted atop a generator frame according to the present disclosure.

The wind turbine 10 may also include a controller 32 centralized within the nacelle 16. Further, as shown, the controller 32 is housed within a control cabinet 34 that is mounted to the generator frame 36. More specifically, as shown in FIGS. 3 and 4, perspective views of the generator frame 36 and the control cabinet mounted to the generator frame 36, respectively, are provided. As shown, the control cabinet 34 is electrically connected to the various wind turbine components via a plurality of cables 48 so as to provide electrical power thereto. Further, as shown particularly in FIG. 4, the cables 48 are often routed through the generator frame 36. Moreover, the controller 32 may be communicatively coupled to any number of the components of the wind turbine 10 in order to control the operation of such components and/or implement various correction actions as described herein.

Referring back to FIG. 2, each rotor blade 22 may also include a pitch drive mechanism 38 configured to rotate each rotor blade 22 about its pitch axis 40 via a pitch bearing 42. Similarly, the wind turbine 10 may include one or more yaw drive mechanisms 44 communicatively coupled to the controller 32, with each yaw drive mechanism(s) 44 being configured to change the angle of the nacelle 16 relative to the wind (e.g., by engaging a yaw bearing 46 of the wind turbine 10).

Figure 5:
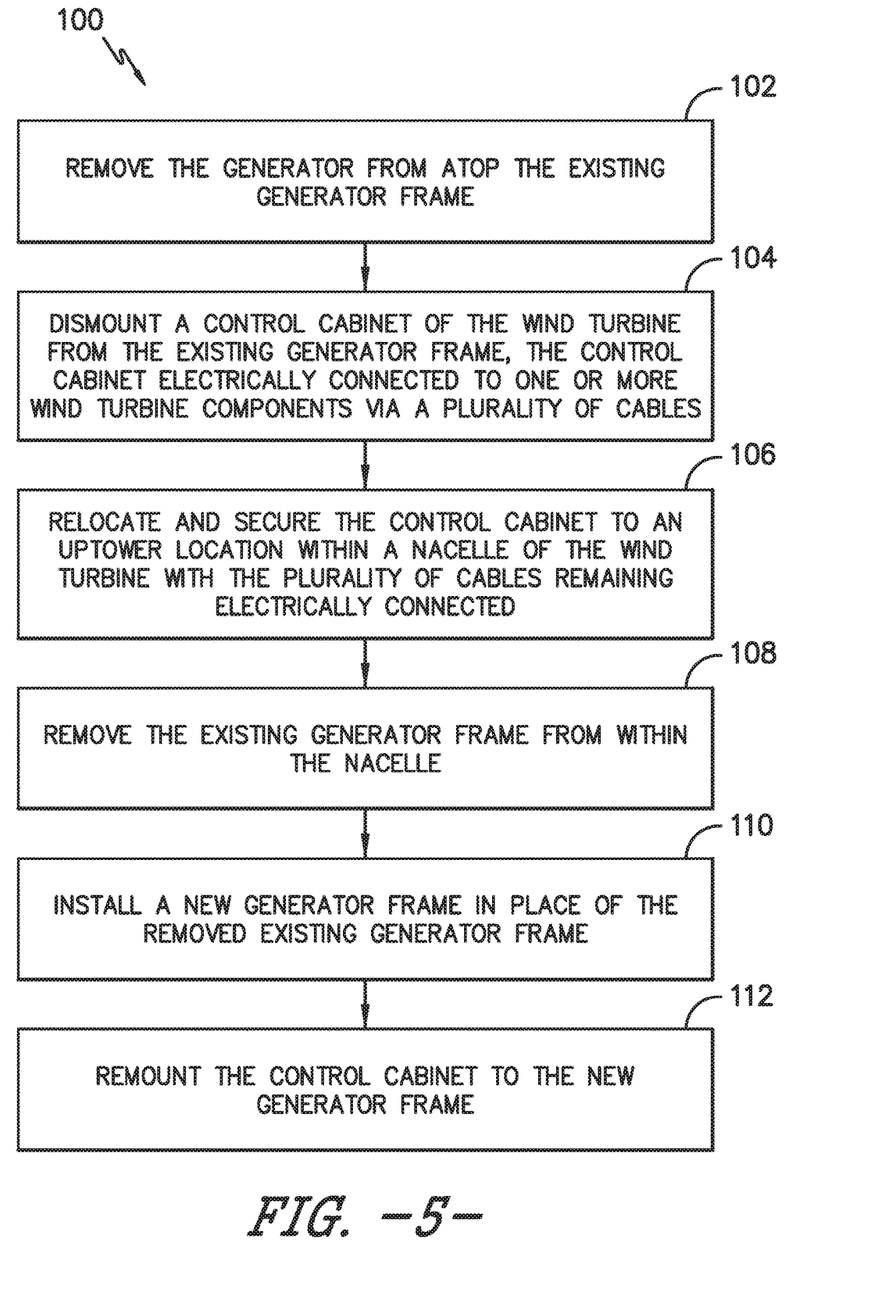
FIG. 5 illustrates a flow diagram of one embodiment of a method for replacing an existing generator frame that supports a generator of a wind turbine according to the present disclosure.
Figure 6:
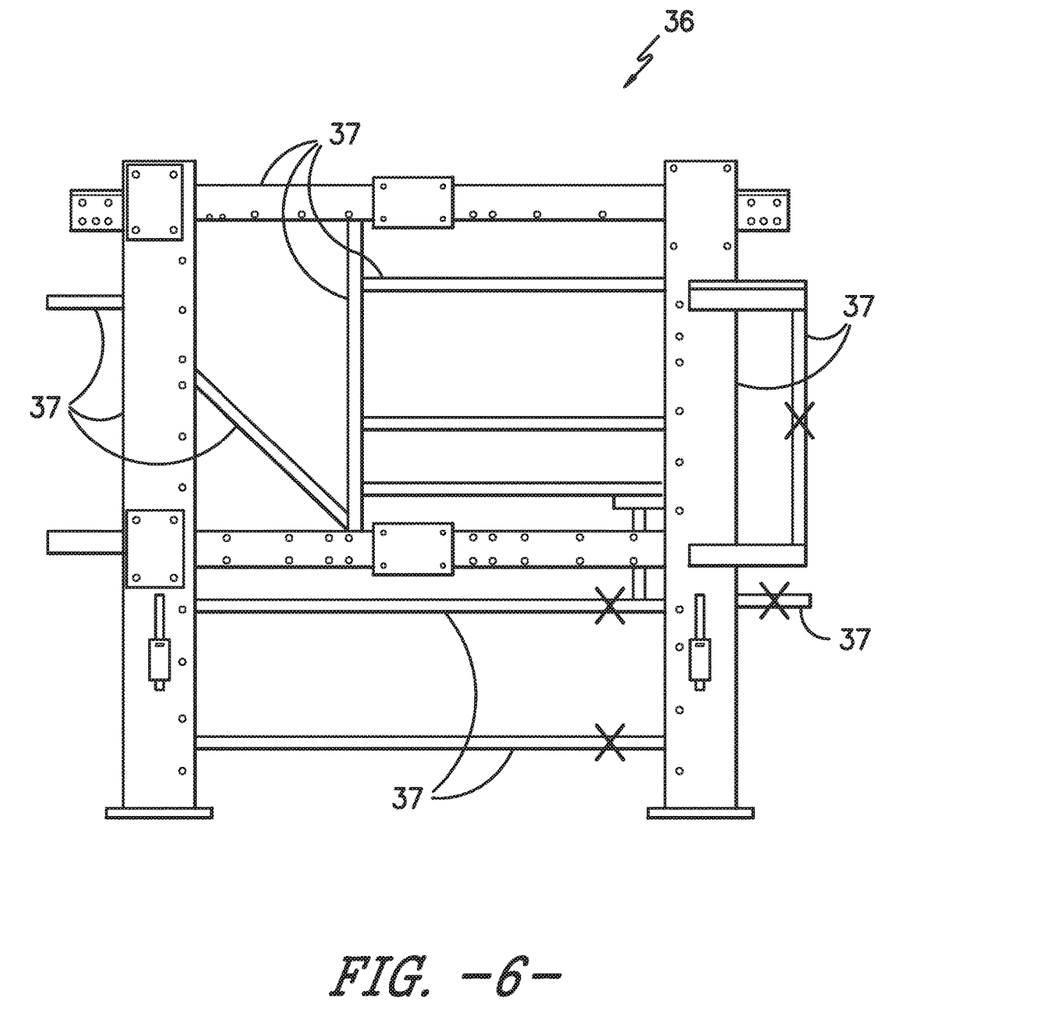
FIG. 6 illustrates a top view of one embodiment of a generator frame for supporting a generator of a wind turbine according to the present disclosure, particularly illustrating certain support structures/beams of the frame marked for removal.

Referring now to FIG. 5, a flow diagram of one embodiment of a method 100 for replacing the existing generator frame 36 of the wind turbine 10 is illustrated according to the present disclosure. As shown at 102, the method 100 includes removing the generator 25 from atop the existing generator frame 36. More specifically, in one embodiment, the generator 25 may be removed via a crane and lowered to the ground or some other support surface. After the generator 25 is removed, the method 100 may also include removing one or more support structures 37 from the existing generator frame 36 so as to free up the plurality of cables 48 of the control cabinet 48 that pass through the existing generator frame 36. For example, as shown in FIG. 6, the support structures 37 marked with an X can be removed such that cables 48 from the control cabinet 34 are loosened from the frame 36. It should be understood that the support structure(s) 37 described herein may include beams or cross-members, brackets, or similar.

Referring back to FIG. 5, as shown at 104, the method 100 includes dismounting the control cabinet 34 of the wind turbine 10 from the existing generator frame 36. For example, as shown in FIG. 4, the control cabinet 34 may be secured to the generator frame 36 via one or more brackets, fasteners, or similar. As such, dismounting the control cabinet 34 may simply include unbolting the cabinet 34 from the frame 36.

Figure 7:
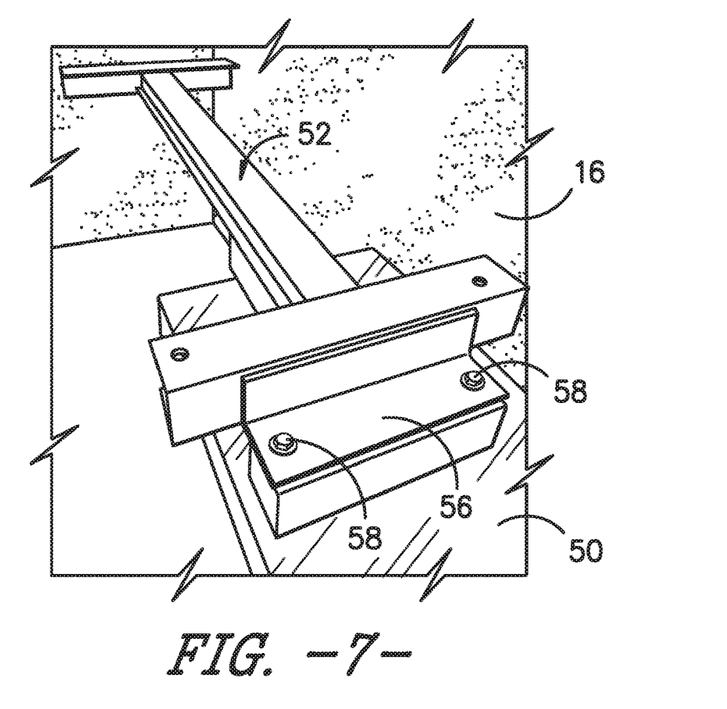
FIG. 7 illustrates a perspective view of one embodiment of a support frame for a control cabinet mounted to an uptower location in a nacelle of the wind turbine according to the present disclosure.

As shown at 106, the method 100 further includes relocating and securing the control cabinet 34 from a first location (i.e. atop the generator frame 36) to a second or different uptower location 50 within the nacelle 16. More specifically, during relocation, the cables 48 of the control cabinet 34 remain electrically connected to the various wind turbine components. In certain embodiments, the uptower location may include a catwalk within the nacelle 16 and/or another support surface therein. For example, as shown in FIG. 7, the method 100 may include securing support frame 52 to the control cabinet 34 and securing the support frame 52 to the uptower location 50 or vice versa. More specifically, in one embodiment, the method 100 may include securing the support frame 52 to the uptower location 50 via at least one of one or more brackets, one or more fasteners, one or more straps, and/or combinations thereof. For example, as shown, the support frame 52 is secured to the catwalk 50 via an L-shaped bracket 56 and a plurality of fasteners 58.

In additional embodiments, the support frame 52 may extend beyond the uptower location 50 (e.g. the catwalk) so as to provide additional mounting space for the control cabinet 34. For example, in certain wind turbines, mounting space for relocating the control cabinet 34 may be limited. Thus, as shown in FIG. 7, the support frame 52 may be mounted to and extend beyond the catwalk 50 so as to fully support the relocated cabinet 34. In certain embodiments, as shown in FIG. 7, the support frame 52 may have an I-beam configuration. However, it should be understood that the support frame 52 may have any suitable configuration for supporting the control cabinet 34.

Once the control cabinet 34 is relocated and secured within the nacelle 16, the method 100 also includes removing the existing generator frame 36 from within the nacelle 16 (as shown at 108 of FIG. 5). For example, in one embodiment, the existing generator frame 36 may also be removed from the nacelle 16 via a crane. As shown at 110, the method 100 includes installing a new generator frame in place of the removed existing generator frame 36. In one embodiment, the method 100 may optionally include removing one or more support structures 37 or support plates/surfaces from the new generator frame 36 before installation. Alternatively, the new generator frame 36 may be designed without the support structures 37 or plates that need to be removed.

Figure 8:
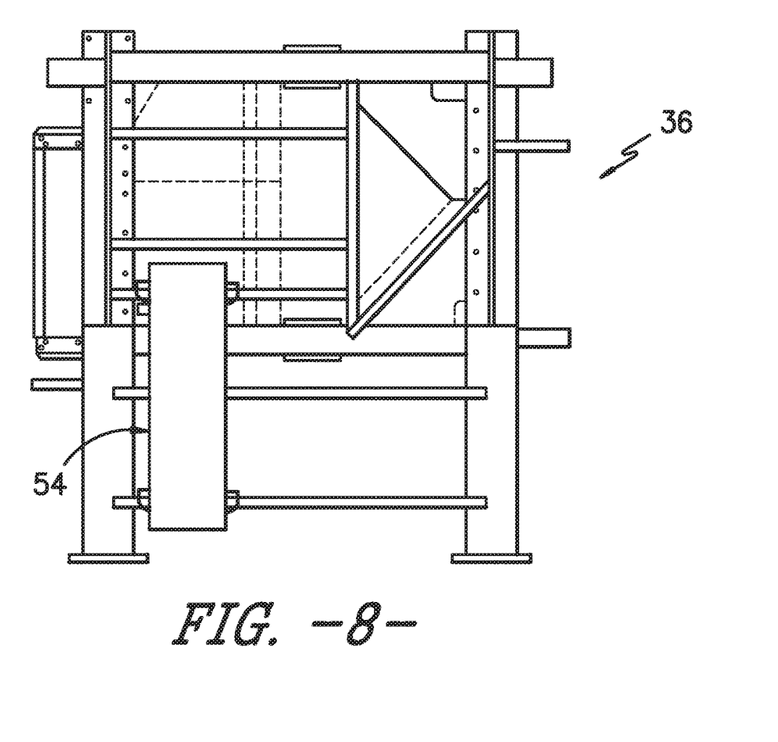
FIG. 8 illustrates a top view of another embodiment of a generator frame for supporting a generator of a wind turbine according to the present disclosure, particularly illustrating cables from the control cabinet secured with a cable tray that is secured to the frame.

As shown at 112, the method 100 includes remounting the control cabinet 34 to the new generator frame. More specifically, in several embodiments, the step of remounting control cabinet 34 to the new generator frame 36 may include dismounting the control cabinet 34 from the uptower location 50, removing the support frame 52 from the control cabinet 34, relocating the control cabinet 34 atop the new generator frame 36, and securing the control cabinet 34 to the new generator frame 36. In addition, the cables 48 may be pushed through the nacelle 16 along with the control cabinet 34 as the cabinet 34 is relocated. In further embodiments, as shown in FIG. 8, the step of remounting the control cabinet 34 to the new generator frame 36 may also include organizing the cables 48 of the control cabinet 34 into a cable tray 54 and securing the cable tray 54 to the new generator frame 36, e.g. underneath one or more of the support structures 37. For example, in one embodiment, the cable tray 54 may be secured to the generator frame 36 via fasteners, zip ties, or any other suitable attachment means.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for replacing an existing generator frame that supports a generator of a wind turbine, the method comprising:
    removing the generator from atop the existing generator frame;
    dismounting a control cabinet of the wind turbine from the existing generator frame, the control cabinet electrically connected to one or more wind turbine components via a plurality of cables;
    relocating and securing the control cabinet to an uptower location within a nacelle of the wind turbine with the plurality of cables remaining electrically connected;
    removing the existing generator frame from within the nacelle;
    installing a new generator frame in place of the removed existing generator frame; and,
    remounting the control cabinet to the new generator frame.

2. The method of claim 1, further comprising removing one or more support structures from the existing generator frame so as to free up the plurality of cables of the control cabinet that pass through the existing generator frame.

3. The method of claim 2, further comprising removing one or more support structures from the new generator frame before installation.

4. The method of claim 3, wherein the one or more support structures of the existing generator frame and the new generator frame comprise at least one of one or more beams or one or more brackets of the generator frame.

5. The method of claim 1, wherein relocating and securing the control cabinet to the uptower location within the nacelle of the wind turbine further comprises:
    securing a support frame to the control cabinet; and,
    securing the support frame to the uptower location.

6. The method of claim 1, wherein the uptower location comprises at least one of a catwalk or another support surface within the nacelle of the wind turbine.

7. The method of claim 5, wherein the support frame extends beyond the uptower location so as to provide additional mounting space for the control cabinet.

8. The method of claim 5, wherein the support frame comprises an I-beam configuration.

9. The method of claim 5, further comprising securing the support frame to the uptower location via at least one of one or more brackets, one or more fasteners, one or more straps, or combinations thereof.

10. The method of claim 5, wherein remounting the control cabinet to the new generator frame further comprises:
   dismounting the control cabinet from the uptower location;
   removing the support frame from the control cabinet;
   relocating the control cabinet atop the new generator frame; and,
   securing the control cabinet to the new generator frame.

11. The method of claim 1, wherein remounting the control cabinet to the new generator frame further comprises:
   organizing the cables of the control cabinet into a cable tray; and,
   securing the cable tray to the new generator frame.

12. A method for removing an existing generator frame that supports a generator of a wind turbine, the method comprising:
   removing the generator from atop the existing generator frame;
   removing one or more support structures from the existing generator frame so as to free up a plurality of cables of a control cabinet of the wind turbine that pass through the existing generator frame;
   dismounting the control cabinet from the existing generator frame, the control cabinet electrically connected to one or more wind turbine components via the plurality of cables;
   securing the control cabinet to a different uptower location within a nacelle of the wind turbine with the plurality of cables remaining electrically connected; and,
   removing the existing generator frame from within the nacelle.

13. The method of claim 12, wherein the one or more support structures of the existing generator frame and the new generator frame comprise at least one of one or more beams or one or more brackets of the generator frame.

14. The method of claim 12, wherein securing the control cabinet to a different uptower location within a nacelle of the wind turbine with the cables remaining electrically connected further comprises:
   securing a support frame to the control cabinet; and,
   securing the support frame to the different uptower location.

15. The method of claim 12, wherein the different uptower location comprises at least one of a catwalk or another support surface within the nacelle of the wind turbine.

16. The method of claim 14, wherein the support frame extends beyond the different uptower location so as to provide additional mounting space for the control cabinet.

17. The method of claim 14, further comprising securing the support frame to the uptower location via at least one of one or more brackets, one or more fasteners, one or more straps, or combinations thereof.

* * * * *